June 23, 1931. L. DE FOREST Re. 18,108
TALKING MOTION PICTURES AND METHOD OF OBLITERATING STIPULATED PORTION OR PORTIONS THEREFOR
Original Filed May 17, 1924
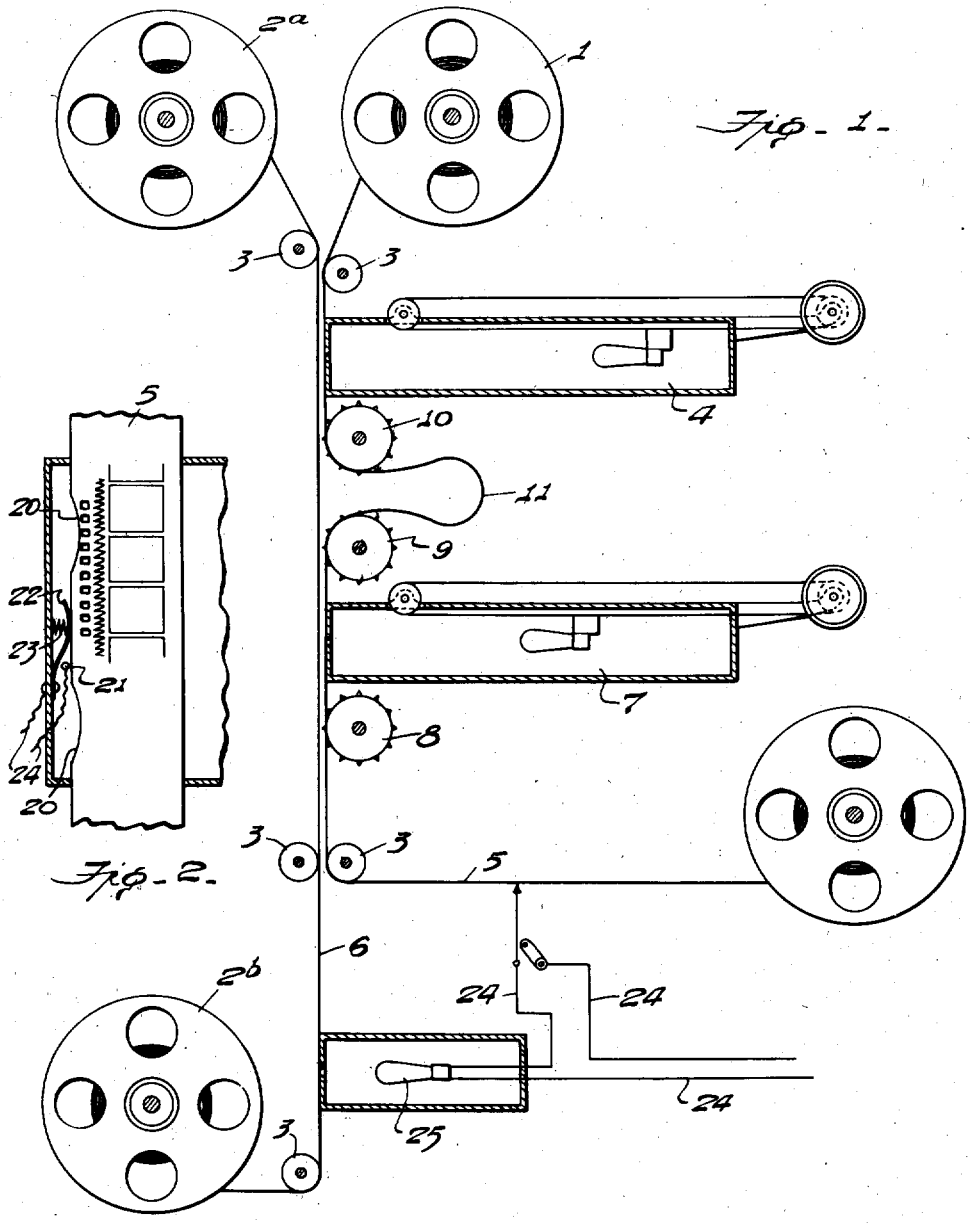
Inventor
LEE DE FOREST
By David Pelton Moore
Attorney Reissued June 23, 1931

Re. 18,108

UNITED STATES PATENT OFFICE

LEE DE FOREST, OF NEW YORK, N. Y., ASSIGNOR, BY MESNE ASSIGNMENTS, TO GENERAL TALKING PICTURES CORPORATION, A CORPORATION OF DELAWARE

TALKING MOTION PICTURES AND METHOD OF OBLITERATING STIPULATED PORTION OR PORTIONS THEREFOR

Original No. 1,695,415, dated December 18, 1928, Serial No. 713,887, filed May 17, 1924. Application for reissue filed December 16, 1930. Serial No. 502,843.

This invention relates to the art of photographically producing on a single film sound and picture records.

One object of the invention is the provision of a method of levelling out or reducing to a given minimum the consequent transparency gradients of stipulated portions of a photographic emulsion before the chemical development thereof.

A further object of the invention is to utilize the method disclosed in rendering effectively silent undesired portions of a sound track record.

A further object of the invention is to provide thereby a means for substantially eliminating or appreciably minimizing ground, machine, and other extraneous noises from a photographic sound record, and especially at such portions thereof where absolute silence is desired.

A further object of the invention is to provide instrumentalities for accomplishing the above objects which are simple in structure and use, efficient in operation, and economical of manufacture and application.

Further objects of the invention will appear more fully hereinafter.

Referring to the drawings:

Figure 1 diagrammatically illustrates a printing process employed in the talking motion picture or phonofilm art embodying my invention.

Figure 2 is a diagrammatic view of a portion of the face view of a talking motion picture film, employed in accordance with my invention.

The same part is designated by the same reference character wherever it occurs throughout the several views.

In printing photographic sound records on a film, such as in motion picture film, i. e. printing a positive or duplicate from a negative or master, special control of the printing light intensity has been found necessary.

It is among the special purposes of my present invention to thus blacken the positive or duplicate on the sound record strip of a film and to do so automatically by marking the film at the appropriate portions thereof for controlling the circuit of the blackening light.

Referring to the drawings, wherein I have diagrammatically illustrated the principles involved, reference characters 1 designate negative or master film reels, the film of which is fed in the usual well known manner past the printing lights so as to effect a printing of the positive or duplicate film fed from reel $2^a$ to reel $2^b$. Suitable guide rollers 3 are employed in the usual well-known way for printing processes of this nature. A printing light 4 of the standard type effects a printing of the picture record from the master film 5 to the duplicate film 6. The sound printing source is diagrammatically illustrated at 7. The usual feed sprockets 8, 9, and 10, commonly employed in film printing apparatus are illustrated, but in this instance a loop 11 is provided between the sprockets 10 and 9, i. e. between the picture record printer 4 and the sound record printer 7, so as to enable the sound record to be in accurately spaced relation to the corresponding picture record—in other words to compensate for the distance between the centroids of the picture and sound apertures during normal projection, and also to make up for variations from this standard distance arising from non-standard recording cameras. It is evident that many other modifications could be introduced to substantially accomplish the compensation referred to, so that the diagram should be taken only in the implicative sense.

In accordance with my invention, I desire to blacken the positive at all portions of the sound recording part of the film where silence is desired, and I therefore mark in any suitable way the negative 5 at such portions and at corresponding portions of the positive subsequent to the usual printing operation, or otherwise, and expose the sound record strip thereof to intense light so as to secure a complete black area at that portion of the strip. This may be accomplished in any suitable way. In Figure 2, I have shown one simple arrangement for automatically accomplishing it, wherein the negative or master film 5 is provided with notches 20 at the portion where a blackened positive or duplicate is desired. A fixed contact member 21 is adapted to cooperate with a movable contact finger 22 which bears against the edge of the film. When a notched portion of the film is reached, the contact finger 22, following the edge of the film, falls into the notch preferably by yieldable pressure, e. g., by means of a spring 23 thereby making contact between the finger 22 and the terminal 21, thus closing the electric circuit of which the wires 24 form a part.

Referring again to Figure 1, the wires 24 may form part of the circuit of a printing lamp 25, which wires are in connection with a suitable source of current supply so that when the lamp 25 is lit intense light is admitted to the positive or duplicate 6 as long as the circuit is thus closed, thus effecting a complete exposure of that portion of the positive or duplicate film corresponding to the notch on the negative or master film.

Many modified arrangements for accomplishing this purpose will readily occur to those skilled in the art without departing from the spirit and scope of my invention as defined in the claims, and similarly, the same or similar types of marking of the film may be utilized for controlling other variable elements, such, for example, as variations in volume of sound reproduction, etc., and I therefore do not desire to be limited or restricted to the specific application of the invention to silencing the film at silent portions of the record; but, having now set forth the objects and nature of my invention, and having shown and described an arrangement for accomplishing the purpose thereof, what I claim as new and useful and of my own invention is:

1. The method of preventing the production of ground noises from positive photographic films having sound records separated by unexposed portions, which comprises subjecting the positive film to light exposure at the unexposed portions corresponding to the silent portions of the negative to blacken those portions of the film when developed.

2. The method of preventing the production of ground noises from positive photographic films having sound records separated by unexposed portions, which comprises subjecting the positive film to light exposure at the unexposed portions corresponding to the silent portions of the negative during the printing from the negative on the positive to blacken those portions of the film when developed.

3. In combination with a negative photographic sound record and a positive to be printed therefrom, and a printing light therefor, of an auxiliary printing light, and means controlled by the negative for controlling said auxiliary light.

4. In combination with a negative photographic sound record and a positive to be printed therefrom, and a printing light therefor, of an auxiliary printing light, means for confining the effect of said light to said positive, and means controlled by the negative for controlling said auxiliary light.

5. In combination with a negative photographic sound record having silent portions marked thereon, and a positive to be printed therefrom and a printing light therefor, of an auxiliary printing light, and means for controlling said auxiliary light by the markings on said negative.

6. In combination with a negative photographic sound record having silent portions marked thereon, and a positive to be printed therefrom and a printing light therefor, of an auxiliary printing light, means for controlling said auxiliary light by the markings on said negative, and means for confining the effect of said auxiliary light to said positive at the sound record portion.

7. In combination with a negative photographic sound record and a positive to be printed therefrom, and a printing light therefor, of an auxiliary printing light, a circuit therefor, and means for controlling said circuit by said negative.

8. In combination with a negative photographic sound record and a positive to be printed therefrom, and a printing light therefor, of an auxiliary printing light, a circuit therefor, means for controlling said circuit by said negative, and means for confining the effect of said auxiliary light to said positive at the sound record portion.

9. In combination with a negative photographic sound record having silent portions marked thereon, and a positive to be printed therefrom and a printing light therefor, of an auxiliary printing light, a circuit therefor, and means for controlling said circuit by the markings on said negative.

10. The herein described method of producing predetermined silence intervals on photographic sound tracks of sound-on-film positives, and to free such sound tracks of any densities in the emulsion that might produce ground noises, which consists in controlling from a developed sound-on-film negative, the production on the sound track of a positive film record blackened portions after such positive film is developed and where such silence and lack of ground noises is desired.

11. The herein described method of producing predetermined silence intervals on photographic sound tracks of sound-on-film positives, and to free such sound tracks of any densities in the emulsion that might produce ground noises, which consists in controlling from a developed sound-on-film negative the production on the sound track of a positive film record portions on the sound track which when the film is run through a sound-on-film reproducing apparatus will produce corresponding silence intervals and no ground noises in the reproduction of sound from such positive.

In testimony whereof I have hereunto set my hand on this 13th day of December, A. D. 1930.

LEE DE FOREST.